Aug. 3, 1965    B. A. LOOMANS ETAL    3,198,491
CONTINUOUS MIXER
Original Filed March 21, 1962
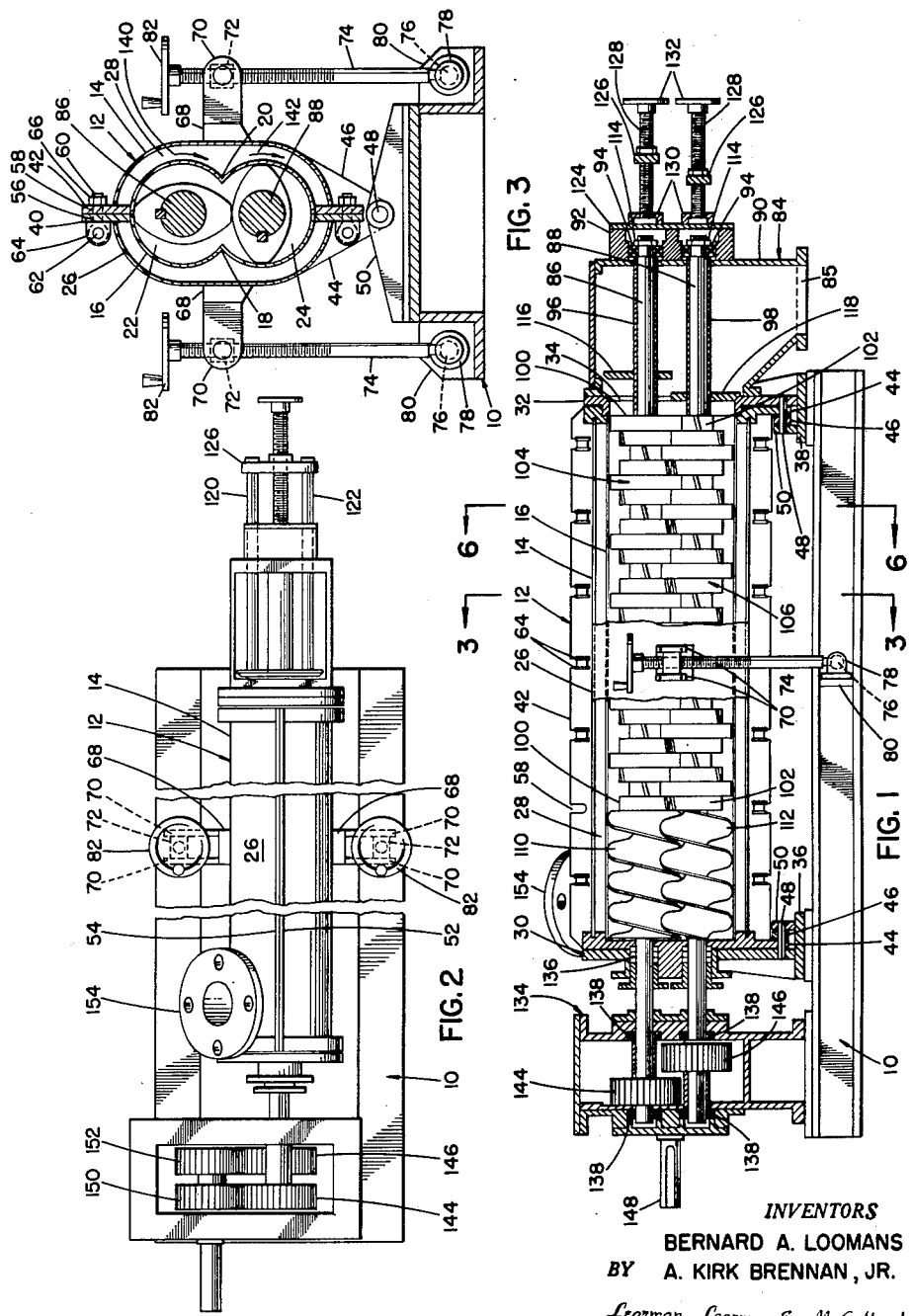
INVENTORS
BERNARD A. LOOMANS
BY  A. KIRK BRENNAN, JR.
Attorney

United States Patent Office 3,198,491
Patented Aug. 3, 1965

3,198,491
CONTINUOUS MIXER
Bernard A. Loomans, York, and Ambrose K. Brennan, Jr., Thomasville, Pa., assignors, by mesne assignments, to Baker Perkins Inc., New York, N.Y., a corporation of New York
Original application Mar. 21, 1962, Ser. No. 181,278. Divided and this application Dec. 23, 1963, Ser. No. 339,316
3 Claims. (Cl. 259—6)

This is a division of application Serial No. 181,278, filed March 21, 1962.

This invention relates to apparatus for homogeneously mixing and/or kneading a variety of materials which may be in plastic, liquid, granular or powdered form, and more particularly to a continuous mixing and kneading apparatus.

An important object of the invention is to provide an improved continuous mixer of the type having a pair of interengaging mixing elements axially disposed in intersecting cylindrical housings, with a material inlet adjacent one end and an open ended material discharge outlet at the opposite end, the discharge outlet being controlled by a pair of weir plates arranged for independent axial movement toward and away from the discharge outlet to control the discharge of material from the mixer and the retention of the material therein.

Other objects and advantages reside in certain novel features of the construction, arrangement and combination of parts which will be hereinafter more fully described, reference being had to the accompanying drawings forming a part of this specification, and in which drawings:

FIGURE 1 is a longitudinal vertical sectional view taken through the improved mixing and kneading apparatus, with parts being shown in side elevation;

FIGURE 2 is a plan view of the apparatus shown in FIGURE 1, with parts broken away;

FIGURE 3 is a sectional view taken on line 3—3 of FIGURE 1.

Referring now to the drawings, the structure selected for illustration comprises a base 10 of any suitable construction for the support of the mixer housing 12 in which is contained the material to be mixed and the means for mixing the same.

The mixer housing 12 includes a horizontal longitudinally extending open ended barrel 14 comprising an inner wall 16 which in transverse cross section is in the form of upper and lower circular major arcs intersecting at 18 and 20 to povide communicating upper and lower intersecting cylindrical chambers 22 and 24, and comprising an outer wall 26 in spaced surrounding relation with respect to the inner wall 16, forming a jacket 28 therebetween to hold a cooling or heating medium.

The barrel 14 is spaced a distance above the base 10 and extends between the transversely extending end plates 30 and 32, end plate 30 forming a closure for the infeed end of the barrel 14 and end plate 32 being provided with a discharge opening 34 the extent of which is controlled by means to be described. The lower ends of the end plates 30 and 32 are provided with respective flanges 36 and 38 resting on and through which the end plates 30 and 32 are rigidly secured on the base 10 by welding or other suitable means.

The barrel 14 is preferably vertically split on its longitudinal center line into the two mating barrel sections 40 and 42 to permit opening of the barrel 14 for facilitating access to the interior thereof. The barrel sections 40 and 42 are pivotally supported subjacent their mating lower forward and rearward edge portions whereby they may be swung outwardly and downwardly to expose the interior thereof. For this purpose, referring to the forward or infeed end of the barrel 14, the barrel sections 40 and 42 are provided adjacent their mating lower forward end portions with the respective depending transversely extending overlapping ears 44 and 46. A longitudinally extending pivot pin 48 extends through registering openings in the ears 44 and 46, one end of pin 48 being supported in the lower portion of the end plate 30 and the other end thereof being supported in an upstanding lug 50 on the flange 36 of plate 30. A similar pivotal arrangement, as shown in FIGURE 1, is provided at the lower rearward or discharge end of the barrel sections 40 and 42.

Any suitable means may be provided for releasably clamping the barrel sections 40 and 42 together. As shown, the adjacent mating upper and lower ends of the barrel sections 40 and 42 are provided with confronting longitudinally extending flanges 52 and 54 provided with a series of longitudinally spaced registering slots 56 and 58. Threaded bolts 60 are pivotally mounted on pivot pins 62 supported by lugs 64 disposed at opposite sides of each of the slots 56 of the flanges 52 of the barrel section 40. The threaded bolts 60 are arranged to be received in the slots 56 and 58, and nuts 66 threaded on the projecting free ends of the bolts when drawn up tightly against the flanges 54 of the barrel section 42, securely clamp the barrel sections 40 and 42 together.

In order to facilitate opening of the barrel sections 40 and 42 about their previously described pivotal mounting, the means for opening the barrel section 40 will now be described, it being understood that similar means is also provided for opening the barrel section 42. Extending laterally outward of the barrel section 40 midway of the ends thereof is a mounting pad 68 to which are removably affixed a pair of longitudinally spaced outwardly extending bearing members 70 arranged to pivotally support therebetween a block 72. A stem 74 is threaded through the block 72 and at its lower end carries a ball member 76 mounted in a split socket member 78 which is supported for pivotal movement about a longitudinally extending horizontal axis on a bracket 80 disposed on the side of the base 10. At its upper end, the stem 74 carries a hand wheel 82 to facilitate turning of the stem 74 in one direction for opening the barrel section 40 and in the opposite direction for closing the same. Thus upon turning the stem 74 in one direction, the pivotally mounted block 72 moves downwardly on the stem 74 whereby the stem 74 and the barrel section 40 swing outwardly and downwardly about their respective pivotal mountings to effect opening of the barrel section 40, and turning of the stem 74 in the opposite direction so that the pivotally mounted block 72 travels upwardly on the stem 74 to effect closing of the barrel section 40.

Suitably secured to the end plate 32 is a discharge housing 84 providing communication with the barrel 14 through opening 34 in the end plate 32. The lower end of discharge housing 84 is formed to provide a discharge spout 85.

Extending longitudinally throughout each of the chambers 22 and 24 concentric with the arcuate wall portions of the barrel 14 defining the chambers 22 and 24 and projecting beyond the ends thereof are respective upper and lower shafts 86 and 88. The rear wall 90 of discharge housing 84 is provided with the bearing housing 92 supporting upper and lower ball bearing races 94 in which are respectively mounted the rearward ends of upper and lower shafts 86 and 88.

Sleeves 96 and 98 are telescopically mounted on the rearward ends of shafts 86 and 88, the forward ends of sleeves 96 and 98 projecting through the opening 34 and abutting the rearmost end paddles of a series of abutting upper and abutting lower paddles 100 and 102 of upper and lower mixing units 104 and 106. Paddles 100 and 102 are keyed on their respective shafts 86 and 88, as shown at 108 in FIGURE 4, fixed against relative rotation with respect to their shafts but axially slidable therealong to facilitate assembly and disassembly. The foremost paddles 100 and 102 abut against the spiral feed screws 110 and 112 of mixing units 104 and 106, and are formed with or rigidly secured on the shafts 86 and 88 in the infeed end portion of the barrel 14. As shown in FIGURE 1, the rearward end of the sleeve 98 abuts against the bearing race 94, and a lock nut 114 threaded on the rearward end of shaft 88 when tightly drawn up against bearing race 94, causes the sleeve 98 to press the series of paddles 102 tightly against each other and against the spiral feed screw 112. It is understood, though not shown, that a similar arrangement is provided for drawing the paddles 100 tightly up against each other and against the spiral feed screw 110.

The opening 34 from the barrel 14 into the discharge housing 84 is controlled by upper and lower weir plates 116 and 118. The weir plates 116 and 118 are longitudinally slidably mounted on the sleeves 96 and 98, being arranged when moved to the left, as viewed in FIGURE 1, to seat against the edge of the end plate 32 defining the opening 34 to form a closure therefor. Means is provided for individually moving either of the weir plates 116 and 118 rearwardly a desired distance from closed position to control the opening 34. For this purpose, referring to FIGURES 1 and 2, a pair of longitudinally disposed rods 120 and 122 spaced at opposite sides of the sleeve 96 are rigidly secured at one end in any suitable manner to the rear face of the weir plate 116 and extend through and are slidably supported in the bearing housing 92 and the bearing housing cover 124. The projecting ends of the rods 120 and 122 are connected by a cross plate 126 and a threaded stem 128 is threaded through the cross plate 126 intermediate the ends thereof. One end of the threaded stem 128 is rotatably journaled in a split bearing 130 on the bearing housing cover 124 while the opposite or free end thereof is provided with a hand wheel 132. It is evident then, that by turning the hand wheel 132 and consequently the threaded stem 128 in one direction or the other, the interconnected cross plate 126, rods 120 and 122, and weir plate 116 will be moved in a forward or rearward direction, whereby the weir plate may be moved to closed position or opened to any desired extent. It is understood that a similar arrangement is provided for moving the weir plate 118.

At the infeed end of the barrel 14, shafts 86 and 88 project through end plate 30 and into a gear housing 134 suitably mounted on the forward end of the base 10. In order to prevent leakage of material from the barrel 14, packing glands 136 are provided on shafts 86 and 88 secured in any well known manner to the end plate 30. Suitable bearings 138 for the forward ends of the shafts 86 and 88 are mounted in the opposite end walls of the gear housing 134.

The mixing units 104 and 106 are rotated in the same direction as indicated by the directional arrows 140 and 142. For that purpose, axially spaced gears 144 and 146 are disposed in the gear housing 134 on shafts 86 and 88, respectively. A drive shaft 148, offset laterally and disposed between the horizontal planes of the shafts 86 and 88 extends into and is suitably journaled in the gear housing 134. Mounted on the drive shaft 148 are axially spaced gears 150 and 152, the gear 150 meshing with gear 144 and the gear 152 meshing with gear 146.

The material to be mixed is introduced into the barrel 14 through conduit 154 arranged to open into the upper forward end portion of one of the barrel sections 40, 42, in the present instance barrel section 40.

Each of the paddles 100 and 102 is identical in cross section, being generally lens shaped. Each pair of mating paddles 100 and 102 is disposed with the major axis of one paddle at right angles with respect to the major axis of the other paddle. Considering one pair of mating paddles 100 and 102, the paddle 100 at the extremities of its major axis is formed with arcuate crests having a radius of curvature equal, except for a negligible amount to provide working clearance, to the radius of curvature of the wall defining the chamber 22. Paddle 102 is provided with similar arcuate crests. It is evident then, that upon rotation of the paddles 100 and 102, their respective crests wipe clean the walls of their respective chambers 22 and 24.

The flank profiles of the paddles 100 and 102 are of such a configuration that when the shafts 86 and 88 are revolved at the same speed and in the same direction, each paddle on one shaft has its entire flanks wiped clean by a mating paddle on the other shaft.

With viscous materials or free flowing granular or powdered materials the continuous spiral feed screws 110 and 112 may not be necessary and paddles 100 and 102 may be employed throughout the chambers 22 and 24, and similarly where the material is introduced as a liquid and chemical reactions occurring during advance effect a change of the material into pasty or powdered form. It is preferred to employ the spiral feed screws 110 and 112, so that the machine becomes an all purpose one capable of handling all types of materials. In all cases, the weir plates 116 and 118, above described, are individually adjustable to alter the retention time of the material in the chambers 22 and 24 in order to mix the material to the desired degree of homogeneousness. The retention time of the material in the chambers 22 and 24 and at desired points longitudinally thereof may be increased by reversing certain of the mating paddles 100 and 102.

We claim:

1. A continuous mixer comprising a casing in the form of parallel intersecting cylinders, a closure at one end of said casing, an opening in said casing adjacent said end closure for feeding material into said casing, the opposite end of said casing being open to provide a discharge opening, a discharge housing at the discharge end of said casing in communication with said discharge opening to receive material from said casing, a shaft extending axially through each of said cylinders and through said discharge housing, mixing elements in each of said cylinders mounted on said shafts for rotation therewith and arranged to advance material therethrough into said discharge housing, a weir plate in surrounding relation with respect to each of said shafts and arranged together to form a closure for said discharge opening, means for supporting said weir plates from said discharge housing for relative movement axially of said shafts, and means for independently moving said weir plates away from a position closing said discharge opening into said discharge housing to control said discharge opening.

2. A continuous mixer comprising casing means in the form of parallel intersecting cylinders, said casing means having an opening for feeding material into said casing, the one end of said casing means being at least partly open to provide a discharge opening, discharge housing means at the discharge end of said casing means in communication with said discharge opening to receive material from said casing means, shaft means extending axially through each of said cylinders and into said discharge housing means, rotatable kneading elements in said cylinders fixed on said shaft means, with the elements on adjacent shaft means being in radially interengaging relation and arranged to pass material through said cylinders into said discharge housing means, weir plate means on said shaft means arranged to provide adjustable blocking means for said discharge opening, means for supporting said weir plate means for relative movement axially of said shaft means, and means for moving said weir plate means axially to control said discharge opening.

3. The combination defined in claim 2 in which the means for moving the weir plates comprises threaded rod means connected with stationary nut means on said discharge housing.

No references cited.

CHARLES A. WILLMUTH, *Primary Examiner.*